United States Patent
Renke et al.

(10) Patent No.: US 11,256,785 B2
(45) Date of Patent: Feb. 22, 2022

(54) USING SECURE MEMORY ENCLAVES FROM THE CONTEXT OF PROCESS CONTAINERS

(71) Applicant: MICROSOFT TECHNOLOGY LICENSING, LLC, Redmond, WA (US)

(72) Inventors: Maxwell Christopher Renke, Sammamish, WA (US); Taylor James Stark, Redmond, WA (US); Benjamin M. Schultz, Bellevue, WA (US); Giridhar Viswanathan, Redmond, WA (US); Frederick Justus Smith, Redmond, WA (US); Deepu Chandy Thomas, Bellevue, WA (US); Hari R. Pulapaka, Redmond, WA (US); Amber Tianqi Guo, Seattle, WA (US)

(73) Assignee: MICROSOFT TECHNOLOGLY LICENSING, LLC, Redmond, WA (US)

( * ) Notice: Subject to any disclaimer, the term of this patent is extended or adjusted under 35 U.S.C. 154(b) by 89 days.

(21) Appl. No.: 16/565,271

(22) Filed: Sep. 9, 2019

(65) Prior Publication Data

US 2021/0011984 A1 Jan. 14, 2021

Related U.S. Application Data

(60) Provisional application No. 62/872,233, filed on Jul. 9, 2019.

(51) Int. Cl.
*G06F 21/12* (2013.01)
*G06F 12/14* (2006.01)
(Continued)

(52) U.S. Cl.
CPC ........ *G06F 21/121* (2013.01); *G06F 12/1433* (2013.01); *G06F 21/552* (2013.01); *G06F 21/79* (2013.01)

(58) Field of Classification Search
CPC .. G06F 21/121; G06F 12/1433; G06F 21/552; G06F 21/79
(Continued)

(56) References Cited

U.S. PATENT DOCUMENTS 6,305,009 B1 * 10/2001 Goor .................. G06F 8/47
717/116
7,194,446 B1 * 3/2007 Bromley ............ G05B 19/0423
706/45
(Continued)

FOREIGN PATENT DOCUMENTS

CN 111199048 A * 5/2020
CN 111857973 A * 10/2020
WO WO-2019077607 A1 * 4/2019 ............ G06F 12/02

OTHER PUBLICATIONS

Wang et al., "Enabling Security-Enhanced Attestation With Intel SGX for Remote Terminal and IoT", IEEE, doi: 10.1109/TCAD. 2017.2750067, pp. 88-96, Jan. 2018. (Year: 2018).*
(Continued)

*Primary Examiner* — Peter C Shaw
(74) *Attorney, Agent, or Firm* — Workman Nydegger (57) ABSTRACT

Memory is partitioned and isolated in container-based memory enclaves. The container-based memory enclaves have attestable security guarantees. During provisioning of the container-based memory enclaves from a container image, a purported link in the container to a memory address of the enclave is modified to verifiably link to an actual memory address of the host, such as partitioned memory enclave. In some instances, enclave attestation reports can be validated without transmitting corresponding attestation
(Continued)

requests to remote attestation services, based on previous attestation of one or more previous container attestation reports from a similar container and without requiring end-to-end attestation between the container and remote attestation service for each new attestation request.

13 Claims, 5 Drawing Sheets

(51) Int. Cl.
  *G06F 21/55*  (2013.01)
  *G06F 21/79*  (2013.01)
(58) Field of Classification Search
  USPC .......................................................... 726/26
  See application file for complete search history.

(56) References Cited

U.S. PATENT DOCUMENTS

| | | | | |
|---|---|---|---|---|
| 8,489,811 | B1* | 7/2013 | Corbett | G06F 16/188 |
| | | | | 711/114 |
| 10,216,529 | B1* | 2/2019 | Makhov | G06F 9/4411 |
| 10,713,181 | B1* | 7/2020 | Makhov | G06F 9/45558 |
| 2008/0022265 | A1* | 1/2008 | Morris | G06F 8/41 |
| | | | | 717/140 |
| 2016/0085695 | A1* | 3/2016 | Leslie-Hurd | G06F 21/79 |
| | | | | 711/163 |
| 2017/0286721 | A1* | 10/2017 | Xing | G06F 21/71 |
| 2017/0324765 | A1* | 11/2017 | McLaughlin | H04L 63/1441 |
| 2018/0211035 | A1* | 7/2018 | Costa | G06F 21/64 |
| 2018/0211067 | A1 | 7/2018 | Costa | |
| 2018/0212966 | A1* | 7/2018 | Costa | H04L 63/0435 |
| 2018/0336351 | A1 | 11/2018 | Jeffries et al. | |
| 2019/0325044 | A1* | 10/2019 | Gray | G06F 16/284 |

OTHER PUBLICATIONS

Liang et al., "Toward Migration of SGX-Enabled Containers", IEEE, doi: 10.1109/ISCC47284.2019.8969644, 2019, pp. 1-6. (Year: 2019).*

Bazm et al., "Secure Distributed Computing on Untrusted Fog Infrastructures Using Trusted Linux Containers", IEEE, doi: 10.1109/CloudCom2018.2018.00053, 2018, pp. 239-242. (Year: 2018).*

Kelbert et al., "SecureCloud: Secure big data processing in untrusted clouds", IEEE, doi: 10.23919/DATE.2017.7926999, 2017, pp. 282-285. (Year: 2017).*

Vaucher et al., "SGX-Aware Container Orchestration for Heterogeneous Clusters", IEEE, doi: 10.1109/ICDCS.2018.00076, 2018, pp. 730-741. (Year: 2018).*

"International Search Report and Written Opinion Issued in PCT Application No. PCT/US2020/036575", dated Sep. 18, 2020, 10 Pages.

* cited by examiner

USING SECURE MEMORY ENCLAVES FROM THE CONTEXT OF PROCESS CONTAINERS

CROSS-REFERENCE TO RELATED APPLICATIONS

This application claims the benefit of and priority to U.S. Provisional Patent Application Ser. No. 62/872,233, filed on 9 Jul. 2019, entitled "USING SECURE MEMORY ENCLAVES FROM THE CONTEXT OF PROCESS CONTAINERS," and which application is expressly incorporated herein by reference in its entirety.

BACKGROUND

Computer technologies have evolved to the point that computers are now ubiquitous, affecting almost every industry and enabling the storage and processing of disparate types of data.

In order to securely store and process the data, some operating systems and computer hardware have been configured to provide memory partitioning. Memory partitioning is one way to isolate the processes and storage of data within a single computing system and/or within a distributed network of a plurality of computing systems.

For instance, a system can isolate "security critical" data, such as encryption keys, user identities, user credentials and other sensitive data, from other computing processes and data that are not as sensitive, within isolated regions of memory, referred to herein as enclaves. The computing industry sometimes refers to these types of isolated computing environments as "trusted execution" environments and "confidential computing" environments, for example.

The techniques for partitioning memory into enclaves generally exists in multiple forms. One example is hardware-based partitioning, implemented by Intel's SGX, ARM Holdings TrustZone, and others. Another example is based on an operating system or hypervisor, such as Virtualization Based Security (VBS).

VBS uses a hypervisor or another resource management layer to create an additional memory partition within the computing system to isolate and protect the security critical data that is placed therein. With VBS, it is possible to define multiple Virtual Trust Levels (VTLs) that can be used to provide isolation from both user mode and kernel mode. For instance, a typical operating system can be run in a first VTL (e.g., VTL0), for supporting existing user mode and kernel mode drivers, applications, services, etc., while an additional memory partition can be run in a second VTL (e.g., VTL1) of the same system for supporting the implementation of an Isolated User Mode (IUM) and Secure Kernel (SK).

A security boundary between the VTLs is enforceable by the hypervisor or other management layer to prevent, for example, VTL0 from accessing VTL1 by creating an isolated region of memory within a process that is mapped to memory within VLT1, and which the VTL0 will not have access to. This isolated region of memory is an enclave. Such enclaves provide a means for secure, attestable computation in an untrusted environment. Accordingly, even if a process running from VTL1 is attacked by user mode or kernel mode, VTL1 can protect the contents of the enclave.

Hardware-based partitioning is the other general type of memory partitioning that can be used for creating isolated enclaves in memory. One example of hardware partitioning comprises Intel's Secure Guard Extensions (SGX), which includes a set of processor instructions that enable user mode code to allocate private memory regions, comprising enclaves, in a similar manner as VBS.

It will be appreciated that enclaves typically exist within the context of a host process, whether secured by VBS or other hardware-based enclave technology, such that any interaction with an enclave is subject to the existing protections of the host process.

One benefit of partitioning, particularly with the use of virtual machine-based virtualization, is the possibility to partition data and applications in such a manner as to enable high density deployment of server resources and for enabling cloud computing.

Container-based virtualization (sometimes referred to as namespace-based virtualization) is one type of partitioning that can provide even more enhanced compatibility and increased density for scaled services. This is good, because higher compatibility enables lower costs for software development and higher density enables more revenue for the same relative cost of facilities, labor and hardware.

It is also possible, using containers and container-based virtualization, to provide isolated, resource-controlled, and portable operating environments. For instance, when a software application is run within a container, it can execute without affecting the rest of the system and without the system affecting the application. Containers may be specific to one application, or may provide the runtime for multiple applications, providing additional operating system functions and services (e.g. input/output functions, security, etc.).

However, while the partitioning of applications and services into conventional containers has many benefits, including increasing the flexibility and portability of the applications or services, traditional container security boundaries are somewhat porous. One reason for this is that existing container technology relies on the security of the underlying operating system, rather than any particular hardware security guarantee, and the structure of existing containers is intentionally flexible to facilitate application compatibility, resulting in a gap in how data within a container is secured. In this regard, containers are not able provide the same levels of attestable security guarantees that are provided with the aforementioned VBS and hardware partitioning enclave technologies.

There are many emerging container scenarios in IoT and database workloads, however, that are being developed that require secure memory solutions for their containerized applications. But, unfortunately, no system has yet been created for providing such utility due to several challenges that exist with providing such secure memory, particularly in an efficient and scalable manner. Such drawbacks have effectively limited the broad adoption of using containers in distributed systems and particularly where heightened security is required.

For instance, there is presently no operating system that is enabled to provide/enforce secure memory allocation, particularly with robust monitoring and attestation for container security scenarios. The lifecycles of containers are also ephemeral, which makes it somewhat prohibitive to utilize the provisioning, monitoring, and end-to-end security key management and attestation techniques used for other types of partitioning technologies, such as those used for VBS and hardware partitioning.

Accordingly, there is an ongoing need for systems and methods that enable the partitioning and isolating of memory in a secure and attestable manner, and even more particularly for doing so in a manner that could leverage the functional benefits of containers. In some embodiments, security and isolation may be achieved by using a more heavyweight form of virtualization, such as a virtual machine. In some embodiments, some hypervisor-based container implementations may require an enclave. In some embodiments, more heavyweight virtualization techniques are not necessary, as attestation may be used to validate a lightweight container image, and the container-based virtualization technique (with less isolation) may be used to host a security-intense workload only in the memory enclave.

It will be noted, however, that subject matter claimed herein is not limited to embodiments that necessarily solve any of the disadvantages associated with existing system or that operate only in environments such as those described above. Rather, this background is only provided to illustrate one exemplary technology area where some embodiments described herein may be practiced.

BRIEF SUMMARY

Disclosed embodiments are directed towards embodiments for provisioning containers, including container-based memory enclaves, having attestable security guarantees. Disclosed embodiments are also directed towards embodiments for attesting to security guarantees for provisioned containers, including container-based memory enclaves.

The disclosed embodiments provide technical benefits over existing container provisioning techniques by providing new systems and methods for provisioning containers with secure memory isolation, in the form of container-based memory enclaves, as well as by providing attestation infrastructures for efficiently managing attestation of the containers' security guarantees, in an efficient and scalable manner.

Some embodiments include methods and systems for creating a container-based memory enclave. In these embodiments a computing system identifies a container image having a security component that is used for attesting to a particular security configuration that is used by a host system running on a first security domain, the security component being stored at a memory address of the host system. Note that in some embodiments, a virtual machine or container hosts implements the host system including VTL1 and VTL0 memory.

Then, the computing system uses the container image to instantiate a new container in a second security domain that is different than the first security domain, the new container being configured to utilize enclave memory of a host system based on a security component stored at an address of the host system, the new container including a copy of the security component with a particular memory address that is a purported link from the container to the memory address of the security component stored at the host system.

Additionally, during or after instantiation of the new container, the computing system modifies the purported link from the container to the particular memory address of the security component stored at the host system so that the purported link from the container to the memory address is modified to verifiably link the container to the memory address of the host system, thereby creating an attestable state for the container.

Some embodiments also include methods and systems for performing attestation for a container-based memory enclave. In these embodiments a computing system identifies one or more containers residing in a security domain that is different than a first security domain of a host system, each of the one or more containers being configured to reference enclave memory of the host system and using a security component for attesting to a particular security configuration for the enclave memory, the security component being stored at a memory address of the host system and being linked to by one or more references to the security component at the one or more containers.

Then, the computing system obtains an attestation report from a remote attestation service regarding security guarantees of a security configuration of the one or more containers based on the security component. In some instances, this is a single attestation report, rather than multiple attestation reports. Then, subsequent to receiving the attestation report from the remote attestation service, the computing system receives a request to attest to the security guarantees for a particular container of the one or more containers. Then, the computing system attests to the security guarantees for the particular container based on the attestation report that was received prior to the receiving of the request to attest and without requiring a new end to end attestation from the container and the remote attestation service for the new request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments are directed towards embodiments for provisioning containers, including container-based memory enclaves, having attestable security guarantees. Disclosed embodiments are also directed towards embodiments for attesting to security guarantees for provisioned containers, including container-based memory enclaves.

In some instances, the disclosed embodiments provide technical benefits over conventional container provisioning techniques, and existing enclave technologies, by providing new systems and methods for provisioning containers as container-based memory enclaves and by providing attestation infrastructures for efficiently managing attestation of the containers' security guarantees, in an efficient and scalable manner.

The creation of container-based enclaves also creates even more isolation for memory partitions than would be possible with traditional VBS and traditional hardware-based enclaves. For instance, it is noted that traditional enclaves typically exist within the context of a host process, whether secured by VBS or other hardware-based enclave technology, such that any interaction with an enclave is subject to the existing protections of the host process. However, while normal operating system processes do not traditionally have strong mechanisms of isolation, by encapsulating enclave host processes within the context of process containers, in the manner described herein, it is possible to add an additional level of isolation to the system. The use of container-based enclaves can also be monitored and validated as providing attested security guarantees in an efficient and scalable manner.

Additional benefits and functionality of the disclosed embodiments will be described below, including the provisioning and monitoring of container-based enclaves, as well as the attesting to the security guarantees of the container-based enclaves in an efficient and scalable manner.

Figure 1:
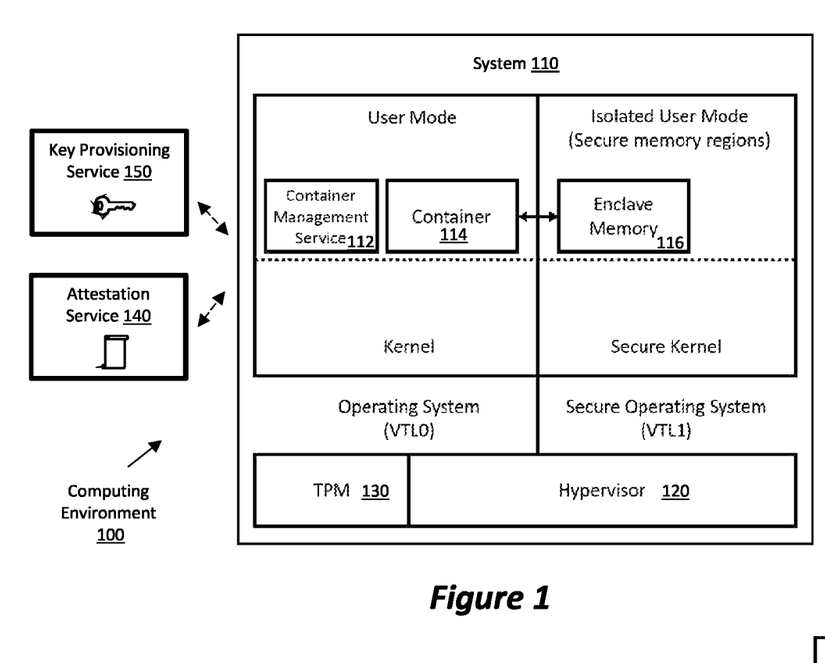
FIG. 1 illustrates a computing environment in which a key provisioning service and attestation service are in communication with a computing system that is providing a user mode operating in a first domain (e.g., VTL0) and an isolated user mode utilizing a secure kernel and an isolated memory enclave is operating in a second domain (e.g., VTL1).

Attention will first be directed to FIG. 1, which illustrates a computing environment 100 that includes a computing system 110 configured to implement aspects of the disclosed embodiments. This computing system 110, for example, includes a container management service 112 that is configured to provision a container 114 and container-based memory enclave 116. The computing system 110 is further configured to implement the container management service 112 and container 114 in a user mode operating in a first domain (e.g., Operating System VTL0) and to implement the isolated container-based memory enclave 116 and corresponding secure kernel in a second domain (e.g., Operating System VTL1).

A hypervisor 120 or other management layer is configured to implement the security boundary between the first domain (VTL0) and the second domain (VTL1). The TPM (Trusted Platform Module) 130 is configured to prove state to an attestation service 140. In some instances, this is accomplished by providing a certified endorsement key (EK) that is provisioned by the TPM manufacturer, such as key provisioning service 150 or another key provisioning service.

During use, a host running the TPM generates an attestation identity key (AIK) that can be used to sign TPM claims (e.g., security guarantees attesting to primitives of the TPM) in an AIK certificate or other report that can later be used to integrity protect and prove the boot state of a host. The AIK certificate is initially provided to the TPM 130 and/or computing system 110 in response to a request for an attestation report. The AIK certificate is provided by an attestation service or other certificate service in response to validating and attesting the co-presence of a certified endorsement key (EK) provisioned by the TPM and the AIK.

The attestation service can also validate or attest to the security guarantees for a particular container-based enclave, (e.g., attesting to its isolation security guarantees and primitives). For instance, the host measures the system boot chain as well as a hash of the operating system binaries in the TPM Platform Configuration Registers (PCRs), which are digitally signed with the AIK and which can be used to prove and attest to the enclave binaries in an attestation report that is validated by the attestation service. During secure kernel boot, a system identity key (IDK) is generated and measured in the TPM. In some embodiments the boot order is also measured as a part of the system boot chain.

After boot, the enclave requests an attestation report for the container from the attestation service. Optionally, the enclave can add a key to the container attestation report that the enclave can share with its clients. To implement this key, the enclave first generates a key pair and digitally signs the public key of the enclave key pair with the system identity key (IDK) in the enclave attestation request that is sent to the attestation service (e.g., attestation service 140 or another attestation service) along with the host TPM boot log and PCRs, all of which are signed by the AIK key and AIK certificate. Once the enclave public key is added to the container attestation report, this attestation report can be treated as the enclave attestation report and the key can be used to communicate securely with this enclave.

The attestation service 140 validates that the TPM boot log is signed correctly with the AIK key/certificate and that the boot chain measured in the PCRs match the TPM boot log. It also validates that the IDK key in the boot log matches the IDK key used to sign the enclave public key in the attestation request. The attestation service also ensures that the IDK key in the boot log matches the IDK key used to sign the enclave public key in the attestation request. If so, the attestation service generates a signed attestation report with the health of the system. This signed report validates the enclave attestation report and contains the public key of the enclave along with the current time stamp, thereby attesting to the security guarantees of the container-based enclave.

Figure 2:
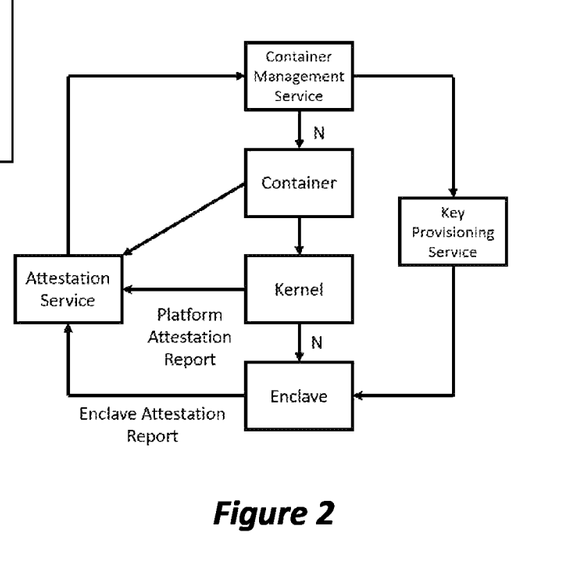
FIG. 2 illustrates one embodiment of a design overview of a system that utilizes containers and enclaves having attestable states and which includes a container management service, an attestation service and a key provisioning service.

FIG. 2 illustrates a design overview of a system that utilizes containers and enclaves having attestable states and which includes a container management service, an attestation service and a key provisioning service. Relationships between these components are described above and will become even more apparent from the description that follows in reference to FIGS. 3 and 4.

It is noted that the container management service is configured to provision, boot, monitor and maintain the state of all containers running on the system, thereby providing a scalable infrastructure for creating any N number of containers.

Each container is also responsible for creating, initializing and allocating its own enclave.

The enclaves and containers are bound via the host OS kernel, which is tracked by the container management service. This binding, while trusted and attestable in the context of the host OS, does not maintain the security boundary of the enclave.

The attestation service can be used to ensure that the appropriate enclave code is running within any given enclave.

In some embodiments, the kernel can report to the attestation service the system/platform attestation report and can, therefore, validate the integrity of the platform used to create the enclave (VBS, SGX, etc.). In some embodiments, the container adds the enclave public key to the system attestation report, creating an enclave attestation report. In some embodiments, full attestation is run on the enclave contents, creating an enclave attestation report.

Enclaves/containers are responsible for generating their own enclave attestation report and providing that report to the attestation service (as described above). The attestation service can coordinate with the container management service to provide attestation to both the containers and the processes interacting with those containers.

Figure 3:
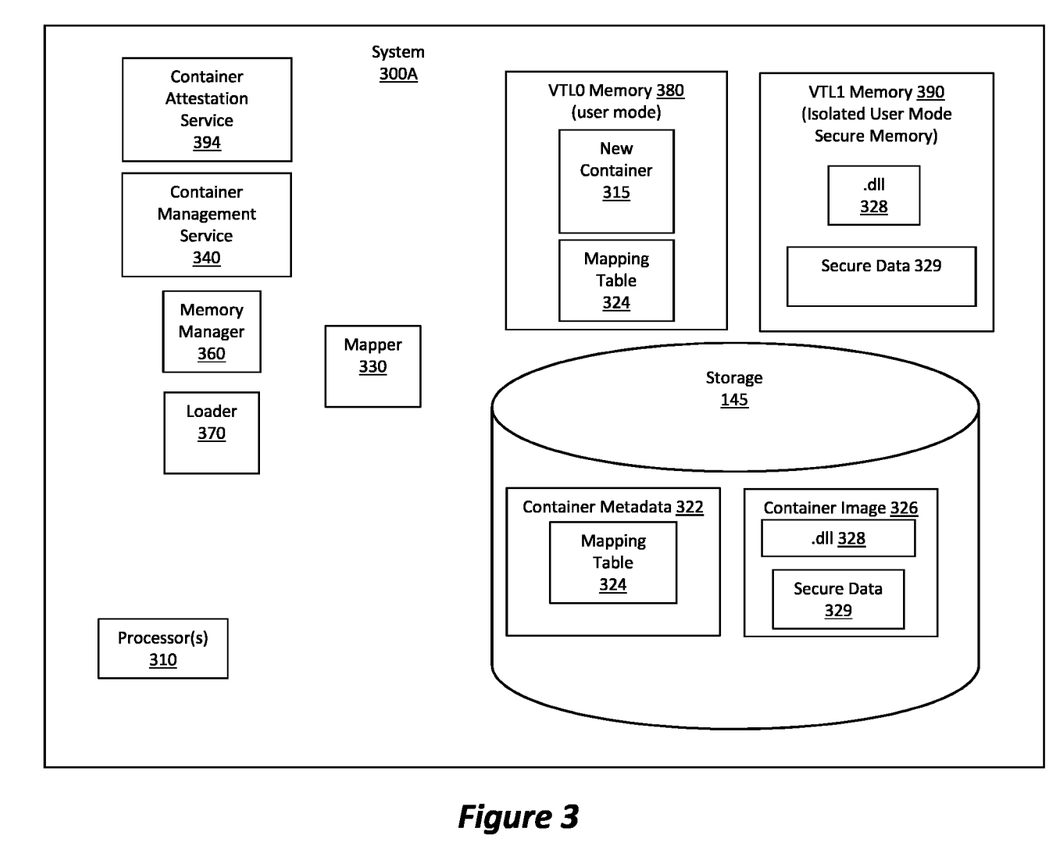
FIG. 3 illustrates a computing system that is configured to include and/or implement aspects of the disclosed embodiments.
Figure 4:
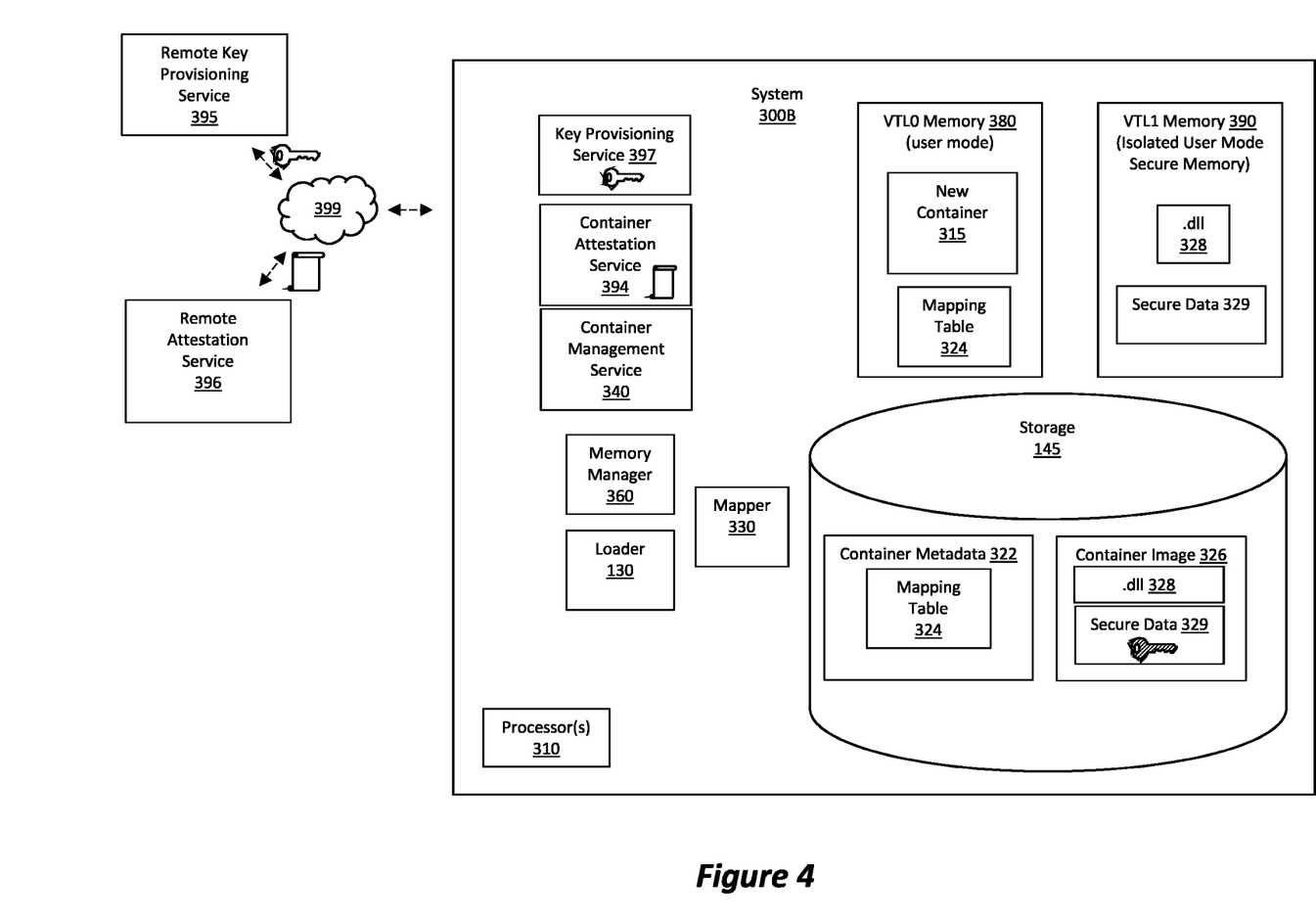
FIG. 4 illustrates another computing system that is configured to include and/or implement aspects of the claimed invention with a key provisioning service and attestation service infrastructure.

FIG. 3 and FIG. 4 illustrate computing systems that are configured to include and/or implement aspects of the disclosed embodiments for provisioning and attesting to container-based enclaves. The system 300A of FIG. 3 specifically corresponds with the flow diagram 500, shown and described in reference to FIG. 5, and the system 300B of FIG. 4 specifically corresponds with the flow diagram 600, shown and described in reference to FIG. 6.

As shown, the illustrates systems 300A and 300B includes one or more hardware processor(s) 310 and storage 320. Notably, the storage 302 is illustrated generically as a bounded cylinder, which could correspond with a hard drive, for example. However, it will be appreciated that storage 320 is not limited to mere hard drive configurations. Instead, storage 320 can include different types standalone and/or distributed storage for one or more computing systems and storage locations.

In some instances, the storage 320 comprises non-volatile storage. In other instances, the storage includes any combination of non-volatile and volatile storage. The storage 320 may also include, for example, memory, which may include volatile memory and/or flash or other non-volatile memory.

In some instances, the memory is used to store and implement partitioned memory, such as partitioned memory containers (e.g., new container 315) and other storage structures (e.g., container metadata 322, mapping table 324, container image 326, container image files (e.g., .dll 328 and secure data 329)), as well as executable code and applications, including the OS (operating systems) and kernels for the computing systems 300A and 300B.

The storage may also contain the memory partitions, including the VTL0 memory 380 and VTL1 memory 390. VTL0 memory 380 comprises a first underlying storage domain that is used by the system OS to implement the user mode and to initiate provisioning of the container. The VTL0 memory may also store a mapping table (described in more detail below) for mapping the address(es) of the provisioned container(s) to the corresponding container enclave(s) in the heightened/isolated security storage domain VTL1 memory 390, which comprises the isolated secure memory enclave.

Storage 320 also stores the executable code and applications, for instantiating or implementing the other illustrated system components (e.g., mapper 330, container attestation service 340, container management service 350, memory manager 360, loader 370, key provisioning service 394) that are used to provision, monitor, load, or otherwise interface with the containers and even remote systems, through one or more network connections 399, such as the remote key provisioning service 395 and remote attestation service 396.

It will be appreciated that the illustrated separation of the various system components is merely provided to facilitate the description of the disclosed embodiments and should not, therefore be interpreted as imposing any physical boundaries or relationships of the system components relative to the storage and to each other, unless otherwise specified.

In regard to the foregoing, it will be noted that there is a physical and/or virtual boundary that is imposed and enforced between the different domains VTL0 memory 380 and VTL1 memory 390, which are used to implement the user mode and the isolated user mode of the system, respectively.

The one or more boundaries established between the partitioned domains can be created and enforced during provisioning of the containers, for example, as described herein. In some embodiments, this enforcement is maintained by a hypervisor. In other embodiments, another management layer is used to enforce and maintain the partitions and memory isolation partitions that are created for different domains. In some instances, the container management service 340 identifies the security/isolation boundary between the different containers. The security/isolation boundary is enforced either with hardware or a hypervisor (not illustrated).

It will be appreciated that while only two different memory partitions are shown in FIGS. 3 and 4, incorporating only a single container in a first security domain (e.g., VTL0 memory 380) with a corresponding container-based enclave partition in a second security domain (e.g., VTL1 memory 390), there can be any number of different partitions. These partitions may also utilize/comprise any quantity of different security domains to support any quantity of containers that are established within the same and/or different security domains, such as, but not limited to different trust levels of a virtual trust levels of a VBS.

Additionally, although not shown, the different partitions can also be based inclusively or exclusively on hardware partitioning, such as Intel's SGX enclave technologies, as well as any combination of hardware and virtual memory partitioning for the containers contained therein.

With reference to the different security domains, it will be appreciated that each security domain can be configured to accommodate different needs and preferences and to facilitate container-based memory enclaves having with different levels of security guarantees for different desired secure memory solutions, including but not limited to existing and even yet to be developed IoT, database, and enterprise workloads and storage scenarios.

In some instances, not shown, the disclosed systems isolate the container-based memory enclaves within one, two or more than two different security domains, with each different security domain comprising a different virtual security domain (e.g., VTL1, VTL2, etc.), having different security guarantees than the underlying host user mode security domain (e.g., VTL0), and being implemented and distributed within a same/shared set of one or more hardware storage device(s) (e.g., a same/shared set of one or more drive(s), disk(s), rack(s), data center(s), etc.). Such scenarios can support multi-tenant embodiments, for example, where different tenants utilize the same back-end container storage system and storage devices, but wherein each tenant has different security constraints and utilizes different container images for provisioning the container-based memory enclaves.

In some instances, not shown, the disclosed systems isolate the container-based memory enclaves within one, two or more than two different security domains, with each different security domain having different security guarantees than the underlying host user mode security domain and each different security domain being physically isolated on different/physically separate and unshared hardware storage devices (e.g., a different set of one or more drive(s), disk(s), rack(s), data center(s), etc. etc.). Such embodiments are particularly useful for distributed networks that utilize physical storage in disparate locations.

In some instances, the disclosed systems isolate a plurality of container-based memory enclaves within a same security domain that is different than the underlying host user mode security domain, wherein each of the plurality of container-based memory enclaves are all provisioned from a common container image.

In some alternative and/or additional embodiments, at least two or more different container-based memory enclaves are provisioned from at least two different corresponding container images.

As reflected in FIGS. 3-4, and as noted previously, the disclosed systems include a container management service 340. This container management service 340 is configured to provision the new containers (e.g., new container 315), as well as to monitor the containers that have been provisioned and their security configurations and memory regions.

A container attestation service 394 is also provided by the system 300A/300B. This container attestation service 394 is an interface, in some embodiments, to facilitate communication with one or more remote attestation service(s) (e.g., remote attestation service 396).

Additionally, since an enclave cannot readily discern, itself, the type of process it is running, since the process that is calling an enclave is controlled by a separate domain (e.g., VTL0) that is untrusted, the remote attestation service 140, and sometimes the local container attestation service 394, provides an interface for the container management service 340 to coordinate with the enclave to attest what type of host process is being used with a given enclave. For example, if an enclave is running within the context of a process isolated container, the attestation service (along with the platform attestation report and enclave attestation report, described above) is able to make an attestable statement that the host process of a give enclave is isolated from the rest of the system.

In this manner, the remote attestation service 140, and sometimes the local container attestation service 394, is configured to validate/attest to the attestation reports provided by the system 300A/300B and/or enclave containers for attesting to the security guarantees of the system and/or container-based memory enclaves, as described above, and particularly as described in reference to FIGS. 1 and 2.

In some instances, the container attestation service 394 merely passes information (e.g., attestation reports, attestation requests, validated attestation reports, etc.) back and forth between the system 300B and the remote attestation service(s) 396.

In other instances, container attestation service 394 is configured to store attestation credentials and to perform attestation of container-based memory enclave security guarantees, without interfacing with the remote attestation service(s) for each attestation request that is received for an enclave. In this manner, the attestation can be performed much more efficiently to accommodate the ephemeral nature of containers and without requiring end-to-end attestation between an enclave and a remote attestation service for each attestation request. This can be particularly efficient for locally validating attestation reports for a plurality of containers/enclaves that are all provisioned from a same container image.

For example, in some instances, the container attestation service 394 is configured to validate or attest to the security guarantees for a particular container-based enclave, (e.g., attesting to its isolation security guarantees and primitives), without requiring a new end-to-end validation of an enclave attestation report for each new attestation report that is sent for validation.

This is possible, for example, by the container attestation service 394 storing credentials including the AIK or other credentials received from the remote key provisioning service 395 and/or the remote attestation service 396 for validating enclave attestation reports and which can be used to validate new enclave attestation reports (from a previous container-based enclave or a new container-based enclave) when it is determined that the new container-based enclave report corresponds to or has a similar profile as a container-based enclave report that was previously validated by the remote key provisioning service.

The determination that the new container-based enclave report corresponds to or has a similar profile as a previously validated container-based enclave report can be made, for instance, by verifying that the new container-based enclave report is signed with the same AIK or other credential/security information received from a prior remote attestation of a same or different container-based enclave having a same security domain and provisioning profile (e.g., having a similar system boot chain in the TPM Platform Configuration Registers (PCRs), having a same IDK key, and/or which is tied to a same underlying certified endorsement key (EK)), for example.

In other instances, the determination can be made by determining that the new container-based enclave report is received from a new container that was provisioned from a same container image having the same secure data 329 used to provision a previously provisioned container and to create a corresponding enclave attestation report that has been validated by a remote attestation service 140.

In some instances, the process of attesting to a new/guest container enclave that is provisioned by a same image as a prior/host container enclave is performed by the system 300A/B using a local and/or remote container attestation service 394, as well as a local and/or remote key provisioning service, and includes the following: (1) the host generates a key (e.g., by using key provision service 394) or obtains the key (e.g., by using remote key provisioning service) that is be sent to new/guest enclave, (2) the new/guest enclave generates attestation report, (3) the new/guest enclave begins a Diffie-Hellman key exchange process with the host, (4) the new/guest enclave presents attestation report to host enclave (with key exchange data), such as by presenting the attestation report to the container attestation service 340, and which includes information that corresponds to a previously validated attestation report for a prior container enclave, such as the host enclave (5) host begins Diffie-Hellman key exchange process, (6) the host validates new/guest attestation report, such as with the container attestation service 340, and which may be based on a previous attestation of a previously provisioned container provisioned from a same container image, (7) the host sends key exchange information to new/guest enclave, using key information provided by the key provisioning service 394 (8) the host and guest enclave complete Diffie-Hellman key exchange, and (10) host encrypts key to be sent to guest enclave with shared key, using the key provisioning service 340.

In such embodiments, it is possible to utilize local key provisioning service 394 and container attestation service 340 to validate an enclave attestation report of a new/guest enclave that is provisioned from a same container image that was previously provisioned and attested to by the remote attestation service.

In some embodiments, the new container 315, once attested, can generate reports for other containers locally, or delegate attestation to other containers. In some instances, for example, these other delegate containers may be longer lived, hence behave like a proxy. This enables the existence of many ephemeral containers on a given host system 300B, for example, as well as the nesting of attestation within different hierarchical structures of containers and delegate containers.

In some instances, the attestation is performed differently and with different tiers/components of the system and/or remote services, based on attributes of the container (e.g., different terms of longevity of the containers, different types of containers, different container locations, different container tenants, different contain content, different container risk profiles, different quality of service guarantees for different containers, container responsibilities (e.g., delegate or primary container) and/or any other container attributes).

For instance, a container that is a longer living container and/or that has a higher risk level may be required to attest to a particular one or more remote attestation service, whereas a different container that is a shorter living container and/or that has a lower risk level may only be required to attest to a different a remote attestation service that is more proximate the system/container or even to attest to a local container attestation service (i.e., 394).

Accordingly, in some instances, the system may access an attestation from a container and deterministically route the attestation to an appropriate attestation service based on a determined term of longevity of the corresponding container (or any other attribute(s) of the container) that generated the attestation. For instance, upon receiving a subsequent container attestation, the system may determine an attribute of a particular container associated with the subsequent container attestation, and then deterministically route the subsequent container attestation to a remote service based on the attribute of the particular container or, alternatively generate an attestation report without routing the subsequent container attestation to the remote service, based at least in part on the attribute of the particular container. Since the attribute may include the longevity of the container, this may also include the system analyzing a first set of containers have a relatively greater longevity than a second set of containers, wherein one or more container attestation associated with the first set of containers are routed to the remote service, while generating one or more attestation reports with local attestation for each of the second set of containers, including the subsequent container, for example, which have a relatively shorter longevity than the first set of containers, and without routing the second set of containers to the remote service.

With regard to the foregoing, it will be appreciated that the attestation from the container may be an attestation request (e.g., an enclave attestation request, a container attestation request, attestation report, and/or other attestation). Additionally, it will also be appreciated that the attribute used to route the attestation may be a container longevity or any other container/enclave attribute, as described above.

Figure 5:
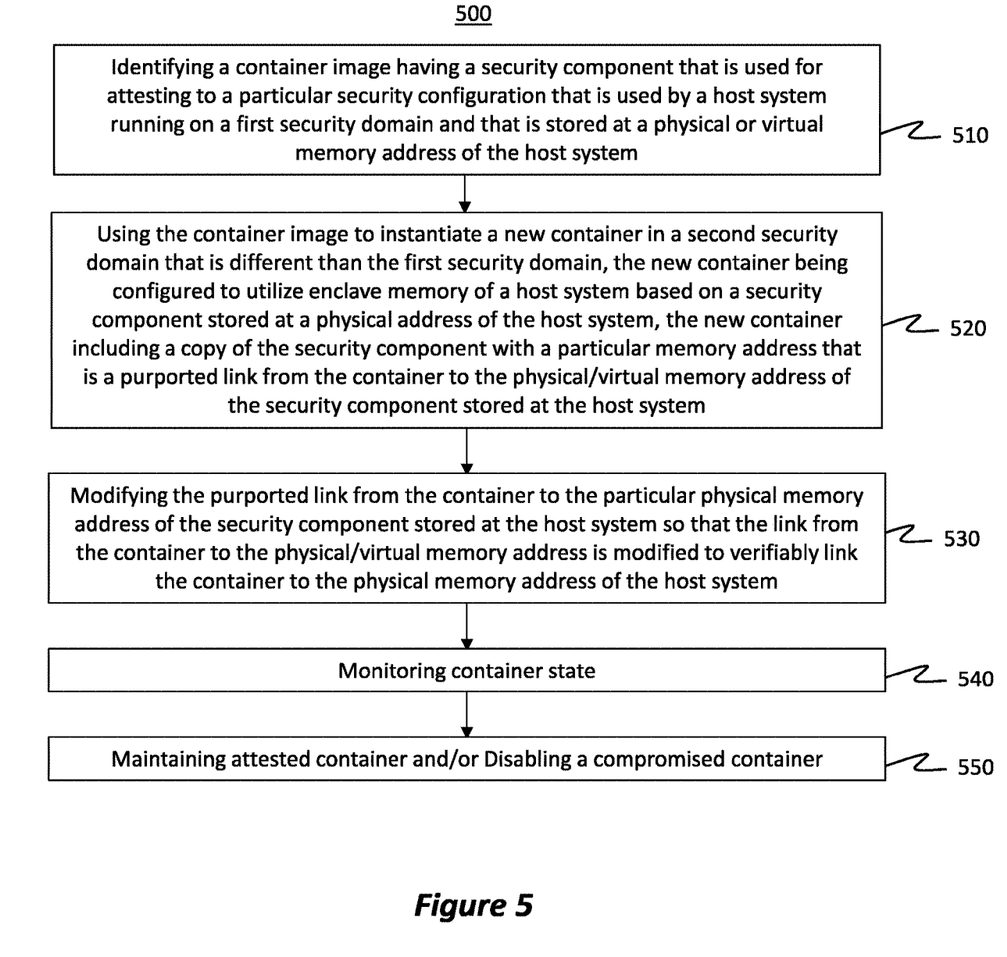
FIG. 5 illustrates one embodiment of a flow diagram having a plurality of acts associated with methods for provisioning a container according to disclosed embodiments.

A flow for provisioning a container with a container-based memory enclave will now be described in reference to the flow diagram of FIG. 5. As shown, the flow diagram 500 in FIG. 5 includes a plurality of acts (act 510, act 520 and act 530) which are associated with various methods for provisioning a container according to disclosed embodiments.

The first illustrated act (act 510) includes the system (e.g., system 300A) identifying a container image (e.g., container image 326) having a security component (e.g., a library file such as .dll 328) that is used for attesting to a particular security configuration that is used by a host system running on a first security domain (e.g., VTL0). In some instances, the container image is identified and loaded into memory (e.g., VTL0 memory 380) by loader 370. The memory manager 360 identifies where to load the container and tracks the provisioned and decommissioned containers to manage the memory effectively.

It is noted that the security component of the container image can take various forms and does not need to be a library file. Instead, the security component can comprise and be configured as any data (e.g. data blob, data structure, unstructured data, et cetera) with configuration information that is attestable and that is either used to generate an enclave attestation request or that has information that is included in an enclave attestation request. In some instances, the security component includes information that identifies the security configuration profile of the container image 326 or the isolation attributes of the enclave memory where it is loaded.

The security component will be loaded in a memory location of the host system, which may include a location within the enclave memory partition of the host system (e.g., within VTL1 memory 390), for example. Although not required, the container image 326 may also contain executable code or other secure data 329 that is decrypted with one or more keys provided by the key provisioning service 394, after being provisioned and such that the executable code is automatically instantiated within the isolated enclave memory partition (e.g., VTL1) of the host system.

Notably, the information from the security component can be used to validate the security guarantees of the corresponding container-based memory enclave after the container is fully provisioned. It is also noted, in some instances, that the security component will be loaded in the enclave memory partition (e.g., VTL1 memory 390) to further isolate and protect the security component from undesired access by components/processes implemented in the underlying storage/security domain (e.g., VTL0 memory 380).

During the initial stages of provisioning the new container, the actual/verifiable memory address of the security component is not yet known, as it is not specified by the container image. Accordingly, the memory address used to update mapping tables and container metadata when provisioning the new container 315 from the container image 326 is only a purported memory address for the security component (which is a placeholder address that is incorrect) and not an actual/verifiable address of the host system. This is why it is only referred to as a purported memory address at this time.

This purported memory address for the security component is recorded during the initial provisioning stages of the container within a data structure, such as a mapping table 324 and/or the container metadata.

It is noted that the mapping table 324 can take various forms and may be a single standalone data structure or a plurality of distributed tables/structures. In some instances, the mapping table 324 is created and maintained by a mapper 330 that identifies the different containers and their allocated memory locations within the system. Once created, the mapping table 324 is referenced by the container management service 340 and memory manager 360 form monitoring and interfacing with the new container 315 and other provisioned containers.

Subsequent to provisioning the container, the container will access the security component via the address/pointer to the security component in the container metadata and/or mapping table to identify the security component information that will be used by the container to generate the enclave attestation report. Accordingly, if the address to the security component is not updated with the correct address, the container will be unable to access the information from the security component nor to produce an enclave attestation report with the appropriate security guarantees for the container/enclave and any/all attempts to attest to those security guarantees will fail.

Additionally, in some instances, it is possible that a computing process, such as a paging operation, might result in a change to allocated memory location for a container. To address such instances, the mapping table 324 can be further updated to reflect changes in allocated memory. Additionally, the container can attest to the attestation service 394 or the container can be validated by the host memory enclave (e.g., VTL1) that validates that the integrity of the container matches the code integrity (CI) policy of the container and such that the memory enclave will issue a new attestation report without having to obtain remote attestation from a remote attestation service 396, for example. Additionally, in such instances, the host memory enclave acts as a delegate for the remote attestation service 396. Note, in some embodiments, this attestation may be marked as metadata in the mapping table, and this may be also tracked by the memory manager so that this metadata might be marked "dirty" by a paging operation and thus the attestation must be "refreshed" each time after. Thus, in this embodiment the memory range would be included in the attestation report.

Accordingly, in some embodiments, it is important to update the memory address for the security component of the referenced container once the container is fully provisioned and the security component is finally loaded in the memory of the host system, such as within the enclave memory partition of the host system.

As reflected by act 520, the system 300A uses the container image 326 to instantiate the new container 315 (which comprises a new container enclave) in a second security domain (e.g., VTL1 memory 390) that is different than the first security domain (e.g., VTL0 memory 380) that is used to implement the user mode of the host system. In particular, the new container is instantiated as a container-based enclave by being configured to utilize an isolated enclave memory partition of the host system, based on the configurations specified in the attestable security component (e.g., .dll 328) and which results in the container being configured to reference and utilize the isolated enclave memory to stored data and to perform processes that are isolated from the underlying user mode memory of the host system.

Once provisioned, the new container 315 includes a copy of the security component having the particular memory address of the host system, and which is stored in the isolated enclaved memory partition of the host system that it references. However, as mentioned above, the current address that is provided by or mapped to by the new container 315, based on the initial container image, and such as reflected in a mapping table 324 and/or container metadata, is only a purported link from the container to the memory address of the security component at the host system (since this address was not known at the time the container image was first being used to provision the new container).

This problem is particularly pronounced and related to the use of a single container image to provision multiple different containers, as well as the storage/isolation of the security component for those containers in enclave memory partitions of the host rather than in the VTL0 memory where the new container is first being provisioned.

To address this problem, the system accesses and modifies the purported link (e.g., recorded/purported physical memory address of the security component), such that the mapped link between the new container and the memory address in the enclave memory partition will verifiably link the container to the correct memory address of the host system in the enclave memory partition (act 530).

This modifying may also include one or more of overwriting a purported memory address of the security component at the new container with the actual memory address of the host system where the security component is actually stored, creating a link from the actual memory address of the host system where the security component is actually stored, changing the purported address associated with the security component within the mapping table 324 to the actual/verifiable address, overwriting or replacing the mapping table 324 having the purported memory address of the security component with a new mapping table 324 that has the correct address to the memory address of the security component, creating a link or new pointer within the mapping table 324 from the original purported link/address to the actual verifiable physical address of the security component in the enclave memory partition.

The modifying may also include or follow the creation of the mapping table and the using of metadata associated with the new container to add the memory address of the security component in the enclave memory partition to the mapping table Once this memory address is changed, updated or otherwise modified in the mapping table to point to the correct/verifiable memory location for the security component, the container can access and generate an attestation report with information based on the security component. Note that in some embodiments, the attestation report is shared with the container management service 350 or a relying party (act 540). In some embodiments, VTL1 is able to monitor the state of the new container 315 and the state of system 300B. The container management service 350 is also able to monitor the container state and the state of the system, in some instances. The monitoring of the container state may include accessing and evaluating an attestation request, evaluating an attestation report, and/or monitoring updates and write requests to the container and/or readdressing/reallocation of the container's enclave memory.

If a given new container 315 or system 300B fails attestation or otherwise appears compromised, the container management service 350 may be requested to tear down new container 315, and/or may proactively take such an action if it independently identifies such a compromise (act 550).

In some embodiments, VTL1 may monitor the Mapping Table 324 and may also prevent updates to map VTL1 memory into new container 315 and similar entities if they fail attestation or are otherwise compromised. In some embodiments additional notifications may be sent from VTL1 or other components to a remote management entity such as remote attestation service 396.

Figure 6:
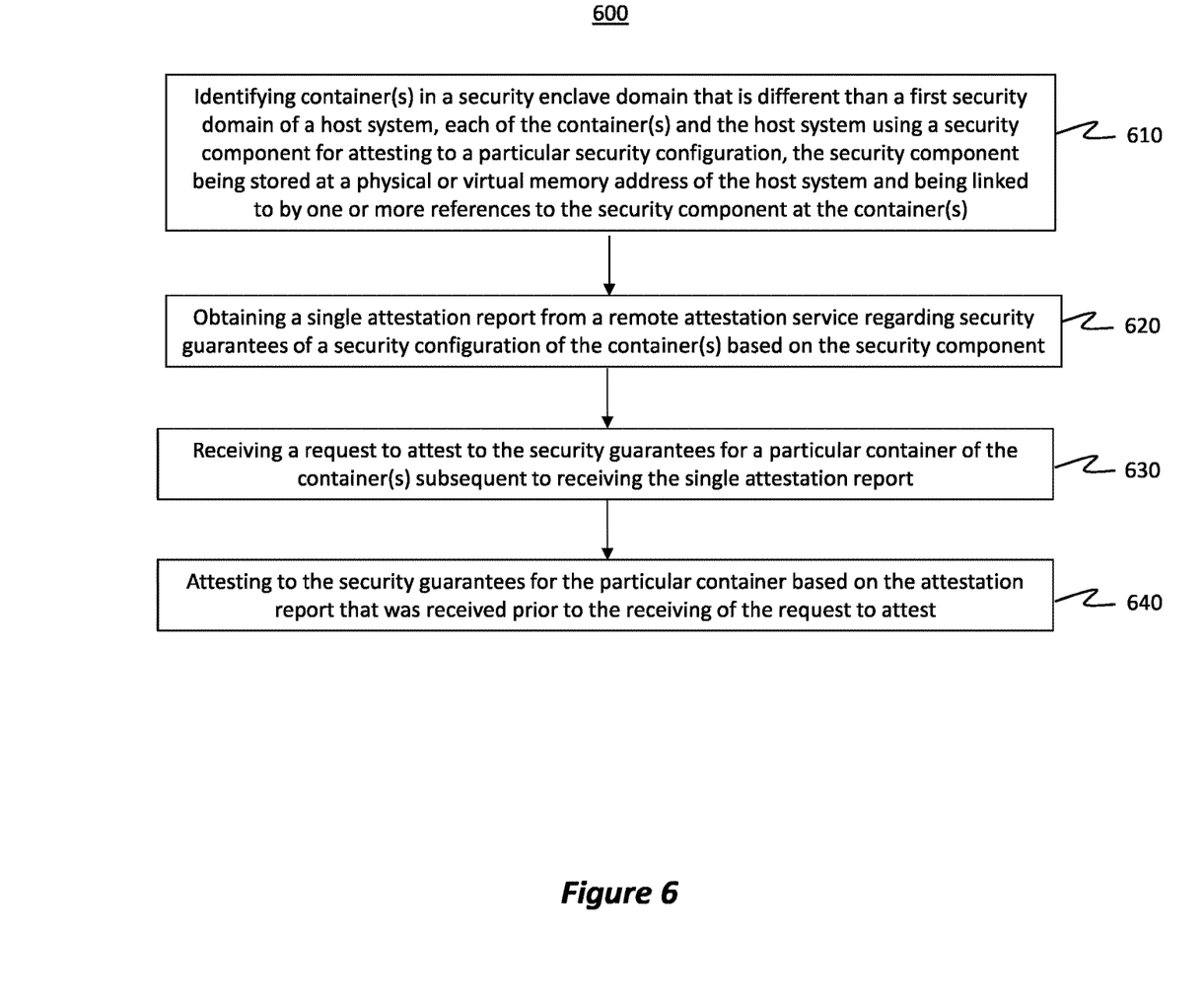
FIG. 6 illustrates one embodiment of a flow diagram having a plurality of acts associated with methods for attesting to security guarantees of a container according to disclosed embodiments.

FIG. 6 illustrates one embodiment of a flow diagram 600 having a plurality of acts (acts 610, 620, 630 and 640) associated with methods for attesting to security guarantees of a container according to the disclosed embodiments. This flow diagram 600 corresponds to the system 300B shown in FIG. 4.

Initially, as reflected in the system 300B illustration and as previously described, a remote attestation service 396 may be used to validate a system attestation report and to validate individual enclave/container reports. The keys and other credentials used in the attestation processes may also be provided by a remote key provisioning service 395. However, as further described, the end-to-end attestation and key provisioning for ephemeral containers, particularly containers that are provisioned from the same container image represent wasted resources.

The current system solves some of these inefficiencies by providing a local key provisioning service 394 and a local container attestation service 340 that contain and/or maintain credentials associated with the remote services, but that can be used to directly provide keys to containers during provisioning and/or attestation and to attest to the security guarantees of provisioned containers without passing provisioning or attestation requests for new containers outside of the system 300B to remote services (such as required for end-to-end provisioning and/or attestation) when the new containers are based on a previously used container image used to provision and/or attest to an enclave attestation report for a prior and/or existing container having a container-based memory enclave.

As shown in FIG. 6, the first act implemented by the system is an act of identifying one or more containers residing in a security domain (e.g., VTL1 memory, comprising enclave memory) that is different than a first security domain (e.g., VTL0) of a host system (act 610). Notably, in this act, each of the containers is configured to reference the enclave memory of the host system and to use a security component for attesting to a particular security configuration for the enclave memory. This security component is also stored at a particular memory address of the host system, such as in the enclave memory, and is linked to by one or more references to the security component at the one or more containers.

The next act includes the system obtaining a single attestation report from a remote attestation service that validates security guarantees of a security configuration of the one or more containers based on information obtained by or that includes the security component. (act 620). This may occur, for example, in response to the system submitting a container attestation request to the remote attestation service for a first container that was provisioned by a particular container image and which utilizes the enclave memory of the host system and that used/uses the security component for generating the attestation report.

Next, the system receives a new request to attest to the security guarantees for a particular container of the one or more containers subsequent to the receiving the single attestation report from the remote attestation service (act 630). This may occur, for example, in response to a new/second container (which is provisioned from the same container image that was used to provision the first container) generating and submitting a new attestation request. Alternatively, the particular container may be the first container that is submitting an additional attestation request or that is resending a previously submitted attestation request. Note that in some embodiments this attestation request is for the container, and in some embodiments this attestation request is for the container and the enclave associated with that container.

In some embodiments, the local container attestation service 340 intercepts the new request and prevents the new attestation request from being transmitted to the remote attestation service that was used to validate the first/single attestation report in response to a prior attestation request. In some embodiments network connectivity to the remote attestation service fails, times out or is otherwise unreliable, thus the new request being transmitted to the remote attestation service that was used to validate the first/single attestation report in response to a prior attestation request does not reach its intended destination.

Instead, the system (e.g., local container attestation service 340) independently (without checking with the remote attestation service) validates and/or otherwise attests to the security guarantees of the security configuration of the particular container (act 640). This act is performed, for example, in response to determining the particular container is provisioned from the same container image used to provision a prior container that has generated the attestation report that was validated in the single attestation report and based on that prior attestation report which was received prior to receiving the new request to attest.

In some instances, acts 630 and 640 repeat, for different container attestation requests, such that the system attests to the security guarantees for a plurality of different containers that each include a reference to the same security component that is stored at the memory address of the host system, which are all provisioned from the same container image, and based on the previous validation of the security guarantees via the previously received/signed attestation report that was generated for another container provisioned from the same container image.

In some embodiments, the attestation service may be tiered to multiple tiers of caching, for example, one tier may run in a container itself, another tier may run in the host, and a $3^{rd}$ tier may run in a remote service such as remote attestation service 396, and so forth. In this case, validation of container images may be reported (or propagate) to different tiers, and then be "cached" to ensure that the attestation service is highly available.

With regard to the foregoing, it will be appreciated that the nesting of the different attestation within different tiers may also include structured and/or deterministic attestation at each tier. For instance, for each tier of attestation, the system may independently identify attributes of the container generating the attestation report to be attested to. Based on these attributes, the attestation can be performed within the same tier by the component/service that is responsible for attesting at that tier level (e.g., by the container, by a delegate container, by the host, by a remote service, etc.) or the request for attestation can be bumped to another tier/attestation service or component.

It will be appreciated that the foregoing embodiments can be used to overcome many of the shortcomings associated with conventional memory partitioning techniques and in a way that utilizes the layered isolation of containers for providing container-based memory enclaves and in a manner that is scalable and efficient.

It will be appreciated that the methods described herein may be practiced by a computing system, such as those described above and those that are claimed, and which include one or more processors (e.g., hardware processors) and computer-readable media comprising computer memory and/or one or more other hardware storage device(s) storing computer-executable instructions that are executable by the hardware processors and that, when executed by the hardware processors, cause the corresponding computing system to perform various functions, including the execution of the acts recited in the methods described herein.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or transmit desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable storage medium having stored computer executable instructions which are executable by the one or more processors for configuring the computing system to implement a method for creating a container-based memory enclave, and by at least configuring the computing system to perform the following:
   identify a container image having a security component that is used for attesting to a particular security configuration that is used by a host system running on a first security domain;
   use the container image to instantiate a new container, the new container being configured to utilize enclave memory in a second security domain of the host system based on a copy of the security component that is stored in the enclave memory at a particular memory address of the host system when the new container is instantiated, the container image providing a purported link of the new container to a purported memory address of the copy of the security component stored in the enclave memory of the host system; and during or after instantiation of the new container, modify the purported link of the new container to the purported memory address of the copy of the security component stored in the enclave memory into a particular memory address of the copy of the security component stored at the particular memory address of the host system and so that the purported link of the new container to the purported memory address is modified to verifiably link the new container to the particular memory address of the security component stored in the enclave memory at the particular memory address of the host system.

2. The computing system of claim 1, wherein the modifying the purported link comprises overwriting the purported memory address with the particular memory address of the security component stored in the enclave memory at the particular memory address of the host system.

3. The computing system of claim 1, wherein the modifying the purported link comprises creating a link to the particular memory address of the security component stored in the enclave memory at the particular memory address of the host system.

4. The computing system of claim 1, wherein the modifying the purported link comprises updating the purported memory address in a mapping table associated with the security component to include or reference the particular memory address of the security component stored in the enclave memory at the particular memory address of the host system.

5. The computing system of claim 4, wherein the method further includes creating the mapping table and, during or after instantiating the new container, using metadata associated with the new container to add the referenced address to the mapping table.

6. The computing system of claim 1, wherein the security component comprises a library file.

7. The computing system of claim 1, wherein the security component includes data that is used to generate an attestation report regarding the security configuration for the new container.

8. The computing system of claim 7, wherein the computer executable instructions are further executable by the one or more processors for configuring the computing system to perform attestation of security guarantees associated with the security configuration for the new container.

9. A method for creating a container-based memory enclave, the method comprising:
identifying a container image having a security component that is used for attesting to a particular security configuration that is used by a host system running on a first security domain;
using the container image to instantiate a new container, the new container being configured to utilize enclave memory in a second security domain of the host system based on a copy of the security component that is stored in the enclave memory at a particular memory address of the host system when the new container is instantiated, the container image providing a purported link of the new container to a purported memory address of the copy of the security component stored in the enclave memory of the host system; and
during or after instantiation of the new container, modifying the purported link of the new container to the purported memory address of the copy of the security component stored in the enclave memory into a particular memory address of the copy of the security component stored at the particular memory address of the host system and so that the purported link of the new container to the purported memory address is modified to verifiably link the new container to the particular memory address of the security component stored in the enclave memory at the particular memory address of the host system.

10. The method of claim 9, wherein the modifying the purported link comprises overwriting the purported memory address with the particular memory address of the security component stored in the enclave memory at the particular memory address of the host system.

11. The method of claim 9, wherein the modifying the purported link comprises creating a link to the particular memory address of the security component stored in the enclave memory at the particular memory address of the host system.

12. The method of claim 9, wherein the modifying the purported link comprises updating a mapping table associated with the new container to include or reference the particular memory address of the security component stored in the enclave memory at the particular memory address of the host system.

13. The method of claim 9, wherein the security component includes data that is used to generate an attestation report regarding the security configuration for the new container and wherein the method further includes performing attestation of security guarantees associated with the security configuration for the new container.

* * * * *

UNITED STATES PATENT AND TRADEMARK OFFICE
CERTIFICATE OF CORRECTION

| | | |
|---|---|---|
| PATENT NO. | : 11,256,785 B2 | Page 1 of 1 |
| APPLICATION NO. | : 16/565271 | |
| DATED | : February 22, 2022 | |
| INVENTOR(S) | : Renke et al. | |

It is certified that error appears in the above-identified patent and that said Letters Patent is hereby corrected as shown below:

On the Title Page

Item (73) Line 1, change "MICROSOFT TECHNOLOGLY LICENSING, LLC" to --MICROSOFT TECHNOLOGY LICENSING, LLC--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*